United States Patent [19]
Juhasz et al.

[11] 3,910,035
[45] Oct. 7, 1975

[54] CONTROLLED SEPARATION COMBUSTOR

[75] Inventors: Albert J. Juhasz, Parma; Richard W. Niedzwiecki, Brunswick, both of Ohio

[73] Assignee: The United States of America as represented by the United States National Aeronautics and Space Administration Office of General Counsel-Code GP, Washington, D.C.

[22] Filed: May 24, 1973

[21] Appl. No.: 363,691

[52] U.S. Cl............ 60/39.23; 60/39.29; 60/39.74 R
[51] Int. Cl.² .......................................... F02C 9/14
[58] Field of Search............ 60/39.23, 39.65, 39.69, 60/39.74; 431/350, 351, 352, 353; 137/13, 15.1, 15.2

[56] References Cited
UNITED STATES PATENTS
| | | | |
|---|---|---|---|
| 3,631,675 | 1/1972 | Keiter et al. | 60/39.23 |
| 3,714,778 | 2/1973 | Howald | 60/39.74 R |

Primary Examiner—C. J. Husar
Assistant Examiner—O. T. Sessions
Attorney, Agent, or Firm—N. T. Musial; G. E. Shook; John R. Manning

[57] ABSTRACT

A short annular combustor utilizes diffuser bleed to control the airflow distribution in a gas turbine engine at various operating conditions.

5 Claims, 4 Drawing Figures

U.S. Patent  Oct. 7,1975  3,910,035

CONTROLLED SEPARATION COMBUSTOR

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention is concerned with improving the performance of a gas turbine engine at idle, takeoff, cruise, and altitude relight operating conditions by varying the combustor airflow distribution using non-mechanical means.

Conventional combustion systems which do not possess the capability for tailoring airflow distribution to instantaneous operating requirements have certain undesirable features. Among these is the requirement for longer diffusers which increase the overall engine length and weight. Also exhaust emissions from hydrocarbons and carbon monoxide are excessive during engine idle or taxi conditions. This causes an annoying pollution problem at and in the vicinity of airports. Altitude relight performance is low because of the high air velocities existing in the primary zone of the combustor. The performance of the combustor cannot be optimized for each operating condition because it must be compromised to accommodate all conditions.

Mechanically operated vanes and variable area air entry ports have been proposed to control combustor airflow distribution. These devices require a large number of mechanical linkages which have to operate in a high temperature environment. This increases the complexity and weight of the equipment as well as decreases its reliability.

SUMMARY OF THE INVENTION

These problems have been solved by the present invention wherein a short annular combustor utilizes diffuser wall bleed to enable a small fraction of the diffuser inlet airflow to be ducted through the diffuser walls at certain operating conditions. The use of the bleed flow depends on the desired combustor inlet velocity distribution at a given operating condition. When no wall bleed is used, the asymmetric diffuser geometry causes the flow to adhere to the inner wall but to separate from the outer wall. The resulting combustor inlet velocity distribution enables most of the flow to bypass the primary zone of the combustor as required for engine idle and altitude relight conditions. Hence, the desired velocity distribution is obtained at these conditions without applying diffuser bleed.

During takeoff or cruise operation there is sufficient static pressure differential between the diffuser and turbine inlet stages that a certain percentage of the airflow can be bled off through the bleed ports in the outer wall of the diffuser and used for turbine cooling. The effect of bleed on diffuser flow is to cause attachment to the outer wall thereby flattening the velocity profile.

OBJECTS OF THE INVENTION

It is, therefore, an object of the present invention to provide combustion airflow distribution control for a gas turbine engine to improve performance at several operating conditions.

Another object of the invention is to reduce the length and weight of the diffuser in a gas turbine engine thereby minimizing the problem of flow separation.

A further object of the invention is to reduce airflow to the primary combustion zone during engine idle thereby reducing annoying combustor exhaust emissions.

Still another object of the invention is to improve combustion altitude relight capability by creating a low velocity recirculation space around the fuel nozzles and igniters.

DESCRIPTION OF THE PREFERRED EMBODIMENT

Figure 1:
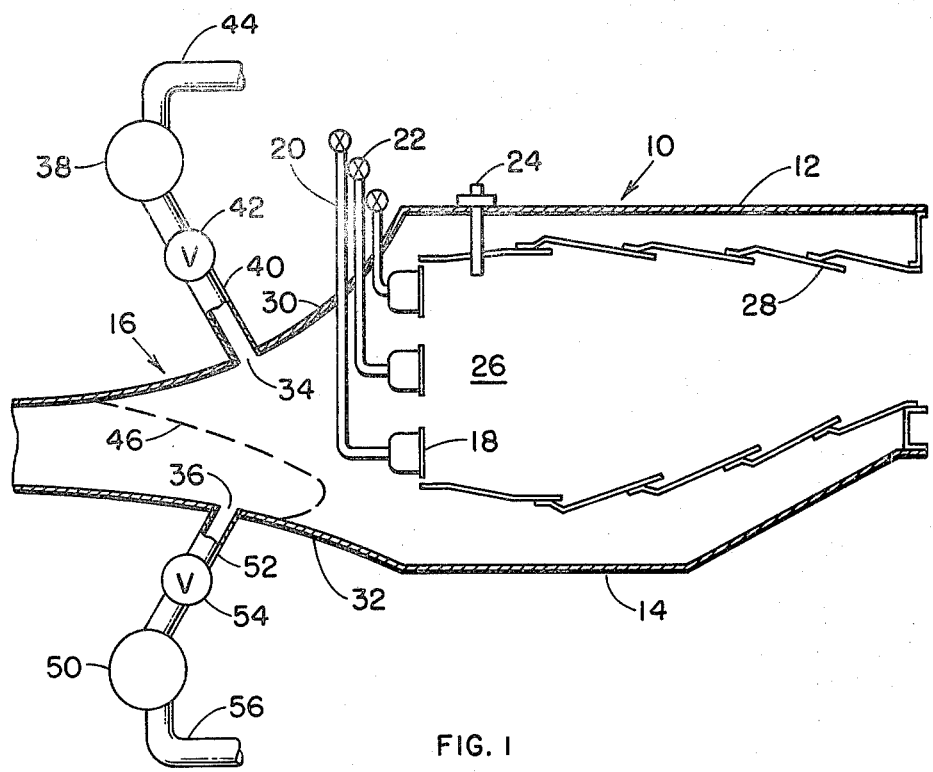
FIG. 1 is a vertical section view of an annular combustor constructed in accordance with the invention showing ports in the diffuser portion and the inlet velocity profile during idle or altitude relight operation.

A short annular combustor 10 constructed to operate with diffuser bleed is shown in FIG. 1. The combustor is used with a gas turbine engine having a compressor and a turbine mounted on a spindle. The combustor is positioned between the compressor and the turbine so that air from the compressor is heated in the combustor and directed through the turbine in a manner well known in the art. A prior art combustor in a gas turbine engine is shown in U.S. Pat. No. 3,581,492.

The combustor 10 has an outer wall 12 spaced from an inner wall 14. Both the walls 12 and 14 encircle the gas turbine engine spindle and extend axially along this spindle. Air from the compressor is supplied to the annular space between the walls 12 and 14 through a diffuser 16. A plurality of nozzles 18 are mounted in the combustor 10. Lines 20 from a suitable supply of liquid fuel are connected to the nozzles 18 through control valves 22. The nozzles 18 may be of the type shown in copending application, Ser. No. 192,970 filed Oct. 27, 1971, now U.S. Pat. No. 3,748,853. It is further contemplated that the nozzles 18 may also be of the pressure atomizing type used in conventional combustors.

Combustion air flows from the diffuser 16 past the nozzles 18 where it is mixed with fuel. A low velocity recirculation space is created around the nozzles 18. The fuel-air mixture is ignited downstream by a suitable igniter 24. The fuel-air mixture burns in a primary zone 26 formed by a film cooled liner 28.

According to the present invention the geometry of the diffuser 16 is asymmetric with a rapidly diverging outer wall portion 30 and a gradually diverging inner wall portion 32. The outer wall portion 30 terminates at the outer wall 12 of the combustor 10 while the inner wall portion 32 terminates at the inner wall 14.

An important feature of the invention is the provision of a plurality of circumferentially spaced bleed ports 34 in the diverging outer wall portion 30 of the diffuser. Similar circumferentially spaced bleed ports 36 are provided in the inner wall 32. The ports 34 communicate with a manifold 38 through several circumferentially spaced ducts 40.

Opening or closing the ports 34 is accomplished by control valves 42 in the ducts 40. The number of ducts 40 depends on the desired circumferential uniformity of the combustor airflow. In cases where the circumferential airflow distribution delivered by the compressor needs to be improved this can be done by individually adjusting the bleed flow through ducts 40 by the control valves 42.

The manifold 38 has a toroidal configuration and encircles the diffuser 16. Air flows from the diffuser 16 to the manifold 38 when the valves 42 are opened. The air is discharged from the manifold 38 to an exhaust duct 44. This air may be used for turbine cooling or customer air requirements, such as driving compressors for cabin pressurization. In the case where the circumferential airflow distribution delivered by the compressor is sufficiently uniform the individual control 42 in ducts 40 can be replaced by a single control valve in duct 44.

The bleed ports 34 and 36 in the diffuser wall enable a small fraction of the diffuser inlet airflow which comprises the retarded boundary layer flow to be removed from the diffuser walls at certain operating conditions. The criterion determining when diffuser bleed is used is the desired combustor inlet velocity distribution at a given engine operating condition.

The line 46 in FIG. 1 shows the inlet velocity profile in idle or altitude relight operation. In these operating modes the ports 34 and 36 are closed and no wall bleed is used. The asymmetric diffuser geometry causes the flow to adhere to the inner diffuser wall 32 but to separate from the outer wall 34. The resulting combustor inlet velocity distribution enables most of the flow to bypass the primary zone 26 of the combustor, thus increasing primary zone air recirculation and local fuel air ratio to near stoichiometric values. Such primary zone conditions lead to increased combustion efficiency and a decrease in exhaust emissions of CO, unburned hydrocarbons, and smoke. Hence, the "no bleed" velocity distribution obtained with this embodiment is suited for idle and altitude relight conditions.

Figure 2:
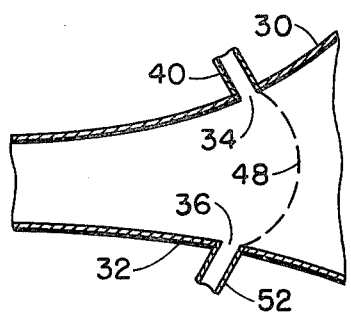
FIG. 2 is a vertical section view of the diffuser portion of the combustor shown in FIG. 1 showing the inlet velocity profile during cruise or take off operation.

The line 48 in FIG. 2 shows the inlet velocity profile in the takeoff or cruise operation. Because there is sufficient static pressure differential between the diffuser 16 and the turbine inlet stations, a certain percentage of the airflow is bled off through the open bleed ports 34 in the outer wall 30 of the diffuser and used for turbine cooling. This diffuser bleed flow may be also used to meet customer air requirements. The effect of bleed on diffuser flow is to cause attachment to the outer wall 30 thereby flattening the velocity profile 48.

The circumferentially spaced ports 36 may also be opened, and air flows to an annular manifold 50 through circumferentially spaced ducts 52. Control valves 54 in these ducts control the bleed flow. Air passes from the manifold 50 to the turbine inlet through a duct 56. It is contemplated that the operation of the inner wall bleed system would be similar to the operation of the outer wall bleed system discussed previously.

A small amount of bleed on the inner wall 32 is applied to trim the profile 48, if necessary. The uniform airflow distribution will provide sufficient cooling air for inner and outer combustor liners and improve the pattern factor at the turbine inlet station. Also, the improved effectiveness obtainable with diffuser bleed will improve cycle efficiency by reducing the combustor pressure loss.

DESCRIPTION OF ALTERNATE EMBODIMENT

Figure 3:
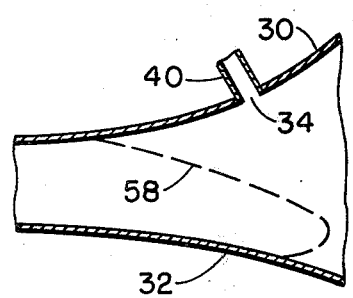
FIG. 3 is a vertical section view of an alternate embodiment of the invention showing ports in the outer wall of the diffuser portion and the inlet velocity profile during idle or altitude relight operation.
Figure 4:
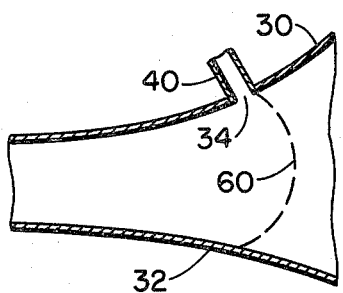
FIG. 4 is a vertical section view of the diffuser portion shown in FIG. 3 showing the inlet velocity profile during cruise or take-off operation.

In the embodiment shown in FIGS. 3 and 4 only ports 34 are provided in the outer wall 30 of the diffuser 16. The inlet velocity profile represented by the line 58 in FIG. 3 is similar to the line 46 in FIG. 1 and is that of the gas turbine engine in idle or altitude windmill relight condition. The ports 34 are closed in this operation mode, and the operation is similar to the embodiment shown in FIG. 1.

The inlet velocity profile represented by the line 60 in FIG. 4 is similar to the line 48 in FIG. 2. In both FIGS. 2 and 4 the gas turbine engine is in the cruise or takeoff condition, and the ports 34 are open. Because there are no ports in the inner wall 32 of the embodiment of FIG. 4, the additional advantages of the ports 36 described above in connection with the operation of FIG. 2 are not obtainable. However, this embodiment is more readily constructed.

The improvement of combustion efficiency at engine idle and consequent reduction of exhaust emission in conventional gas turbine combustors is also possible by using diffuser bleed. In these combustors diffuser bleed flow is either passed overboard or ducted into the bypass stream in fan engines.

While several embodiments of the invention have been shown and described various structural modifications may be made without departing from the spirit of the invention or scope of the subject claims.

What is claimed is:

1. A short annular combustor for a gas turbine comprising a pair of spaced axially extending walls forming a full annulus, an annular liner mounted in said annulus forming a combustion chamber, a plurality of nozzles mounted at one end of said combustion chamber, means for supplying fuel to said nozzles, a diffuser adjacent to said nozzles for supplying air to said annulus thereby forming a combustible mixture with said fuel, the end of the annular liner adjacent to said nozzles is open whereby air from said diffuser flows around said nozzles thereby creating a low velocity recirculation space adjacent to each of said nozzles, said diffuser having an asymmetric geometry formed by a rapidly diverging outer wall and a gradually diverging inner wall terminating at said axially extending walls adjacent to said nozzles, a plurality of circumferentially spaced bleed ports in at least one of said diverging walls for selectively removing a small fraction of the diffuser inlet airflow through at least one of said diverging walls to control the airflow distribution at various operating conditions of the turbine, at least one manifold, means for connecting said bleed ports to said manifold, and a plurality of valves for selectively controlling the bleed flow of air through said ports to said manifold thereby controlling the circumferential airflow distribution.

2. A short annular combustor as claimed in claim 1 wherein both diverging walls have a plurality of circumferentially spaced bleed ports therein.

3. A short annular combustor as claimed in claim 1 wherein said rapidly diverging outer wall has a plurality of circumferentially spaced bleed ports therein and said gradually diverging inner wall is imperforate.

4. A short annular combustor as claimed in claim 1 including means for selectively igniting the combustible mixture in the combustion chamber.

5. In a gas turbine combustor of the type having a plurality of fuel nozzles mounted at an open end of an annular combustion chamber, the improvement comprising a diffuser having an asymmetric configuration for supplying air to said combustion chamber through said open end whereby said air flows around said nozzles thereby creating a low velocity recirculation space adjacent to each of said nozzles, said diffuser comprising a rapidly, diverging outer wall terminating adjacent to said open end, a gradually diverging iner wall terminating adjacent to said open end, a plurality of circumferentially spaced bleed ports in at least one of said walls, at least one manifold in communication with said ports whereby a portion of said air is bled from said diffuser to control the airflow distribution at various operating conditions of the turbine, and a plurality of valves for controlling the bleed flow of air through said ports to said manifold to control the circumferential airflow distribution.

* * * * *